3,176,023
PROCESS FOR PRODUCING TRIOXANE USING A CATION EXCHANGE RESIN HAVING —SO₃H RADICALS
Yoshiaki Yamase, Meguro-ku, Tokyo, Japan, assignor to Yawata Chemical Industry Co., Ltd., Tokyo, Japan, a corporation of Japan
No Drawing. Filed Sept. 7, 1962, Ser. No. 222,184
Claims priority, application Japan, Sept. 12, 1961, 36/32,248
3 Claims. (Cl. 260—340)

As a known process for producing trioxane by the reaction of formaldehyde a process is reported wherein formaldehyde is heated and distilled in the presence of 0.1 to 4.0% sulphuric acid. However, as sulphuric acid is used as a catalyst, such process has various drawbacks in relation to the material of the distilling apparatus.

Further, in the refinement, the distillate is extracted with a solvent insoluble in water, the extract is washed with ammonia water, the formaldehyde mixed in the extract is thereby converted into hexamine and thereafter the extract is dried with calcium chloride and is then cooled to about −80° C. to deposit trioxane or the distillate is cooled and centrifugally separated, the thus obtained crude trioxane is washed with water and is then centrifugally separated, finally absolute methanol is added thereto and the mixture is again centrifugally separated to obtain trioxane. However, in such process, the operation is complicated and the obtained trioxane contains still water, formaldehyde and hexamine as impurities. Therefore, such trioxane as it is, is improper as a raw material for producing a polyoxymethylene of a high molecular weight and requires a further refining step.

As a result of investigating processes for producing and refining trioxane by the reaction of formaldehyde, I have invented a process which is much superior to any conventional process.

The present invention relates to (1) A process for producing trioxane characterized by reaction of formaldehyde using a cation exchange resin having —SO₃H radicals as exchange radicals, (2) A process for producing trioxane characterized by reacting formaldehyde by using a cation exchange resin having —SO₃H radicals as exchange radical, distilling the obtained reaction mixture to remove the cation exchange resin and then extracting and refining the distillate, (3) A process for producing trioxane according to (2) above characterized by using the distillation residue and/or the extraction residue again as a raw material, (4) A process for producing trioxane according to (2) above characterized by carrying out the extraction and refinement by using a solvent of a low boiling point which is insoluble in water and is azeotropic with water and then distilling the extract to produce trioxane of a high purity specifically for producing a polyoxymethylene of a high molecular weight and (5) A process for producing trioxane according to (2) above characterized by cooling and centrifugally separating the distillate without extracting it, adding a solvent of a low boiling point which is azeotropic with water to the obtained crude trioxane and then distilling out the solvent to produce trioxane of a high purity specifically for producing a polyoxymethylene of a high molecular weight.

That is to say, according to the present invention, in case a cation exchange resin having —SO₃H radicals as exchange radical is used, no acidic substance having —SO₃H radicals can be detected in the distillate and the secondary reaction in the distilling kettle can be neglected. The cation exchange resin in the present invention is reusable in its capacity as a catalyst even in distillation for a long time. Especially, according to the present invention, by reusing recovered formaldehyde, trioxane can be produced at a high rate of yield of finally about 90% as based on formaldehyde consumed.

For the cation exchange resin having —SO₃H radicals as exchange radicals to be used in the present invention, there can be enumerated such sulphonic acid derivative of a polystyrol series resin [I] and such resin made from phenol sulphonic acid derivative [II] as are respectively represented, for example, by the following Formulae I and II:

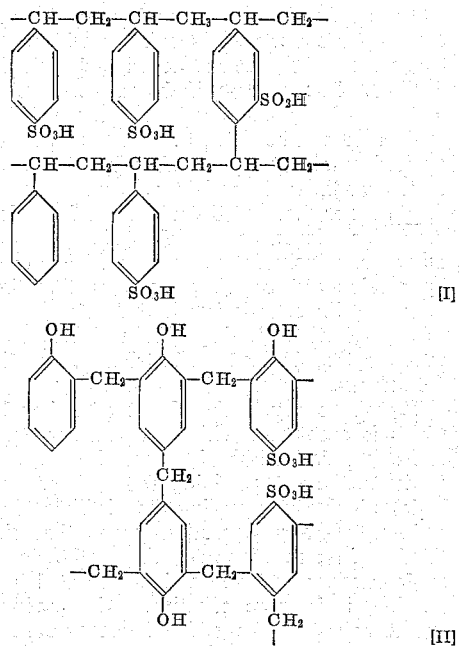

However, if a cation exchange resin having —COOH radicals as exchange radical or an anion exchange resin are used, there is no catalytic function. As described above, according to the present invention, by using a specific cation exchange resin, trioxane can be produced at a high rate of yield.

In the present invention, instead of formaldehyde an aqueous solution (formalin) can be used, for example, more than 40% formaldehyde but it is preferable to use specifically 55 to 75% formalin.

Even if such impurities which can be encountered in producing formalin as, for example, methanol and formic acid are present as mixed in the raw material formalin, there is little influence. But especially, when the methanol is less, the rate of yield of trioxane is higher.

For the cation exchange resin there is used an acid-treated and then water-washed H type cation exchange resin. It is added in an amount of more than 0.5% by weight (in a swollen state) to formalin. It is preferable to use specifically more than 5% by weight of such cation exchange resin.

Then the mixture is heated and distilled to remove the cation exchange resin. The composition (trioxane, formaldehyde and water) of the distillate by the distillation will vary depending on the type of the distilling tower, distilling velocity and distilling temperature. It is best to adjust the distilling temperature to around the azeotropic temperature of 91.4° C. of trioxane and water.

In the present invention, considerable amounts of formaldehyde are contained in the distillation residue at the time of distillation and in the extraction residue at the time of extraction and can be therefore used again as a raw material individually or as mixed.

As described above, according to the present invention, trioxane can be produced at a high rate of yield of finally about 90% by using a specific cation exchange resin as a catalyst. Thus the present invention has a very high industrial value.

Another feature of the present invention relates to a process for producing trioxane of a high purity specifically for producing a polyoxymethylene of a high molecular weight by using a solvent of a low boiling point which is insoluble in water and is azeotropic with water in extracting and refining the above mentioned distillate and then distilling the extract.

That is to say, by using such solvent of a low boiling point which is insoluble in water and is azeotropic with water as, for example, such ethers as isopropyl ether or halogen derivatives of hydrocarbons, trioxane is extracted from the distillate from which the cation exchange resin has been removed and then the solvent is distilled. In such case, if the extract is dehydrated with a dehydrating agent in advance, the amount of solvent to be used can be reduced. Further, the amount of the extracting solvent is preferably in the range of one half to several times the weight of the distillate.

A further feature of the present invention relates to producing trioxane of a high purity specifically for producing a polyoxymethylene of a high molecular weight by cooling and centrifugally separating the above obtained distillate as it is without extracting it, adding a solvent of a low boiling point which is azeotropic with water to the obtained crude trioxane and then distilling the solvent.

That is to say, such solvent of a low boiling point which is azeotropic with water as, for example, ethers or halogen derivatives of hydrocarbons, are added to the crude trioxane (containing some water and formaldehyde) obtained by cooling the distillate to about 0° C. and centrifugally separating it and the mixture is distilled. If the solution consisting of the above mentioned crude trioxane and solvent is dehydrated before the distillation, it is more effective. The preferable amount of the solvent to be added is an amount that can be perfectly azeotropic with the water contained in the crude trioxane or an amount several times as large.

In the above mentioned two refining processes, the water and formaldehyde contained in the reaction mixture will be substantially all distilled out together with the solvent and the trioxane remaining in the kettle will contain substantially no water and formaldehyde. That is to say, the obtained trioxane shows a melting point of 61 to 62° C. (as uncorrected). Above the melting point, it is a colorless transparent fluid liquid and has a fragrance as of camphor without the smell of formaldehyde. When it is distilled, there is obtained a colorless transparent liquid of a boiling point of 112 to 114° C. (as uncorrected) which will solidify after being cooled. Thus the product of the present invention is very high in purity and contains substantially no water and formaldehyde. Therefore, when it is polymerized as it is, a polyoxymethylene of a high molecular weight is obtained at a high rate of yield. In the conventional process, even through many steps, the product contains still water, formaldehyde and hexamine, rendering the trioxane improper as a raw material for polymerization and additional complicated steps such as an additional refining step are required.

Thus, in the present invention, the complicated steps as in the conventional process are not required and yet trioxane of a high purity can be produced. Therefore, the present invention is very valuable in the industry.

Examples of the present invention shall be given in the following:

EXAMPLE 1

61%-formalin obtained by mixing 70 parts of paraformaldehyde and 40 parts of water and 10 parts of an H type cation exchange resin (Amberlite IR–120 made by U.S. Co. Rohm & Haas) obtained by treatment with sulphuric acid and washing with water were mixed into a distilling kettle provided with a distilling tower and a formalin continuously adding device and were distilled. The distilling temperature was kept at 92° C. by means of an automatic temperature adjuster. With the start of the distillation, 173 parts of the said 61%-formalin were continuously added to the distilling kettle by means of the continuously adding device. When the distillation was carried out for 24 hours while keeping the amount of the liquid in the kettle constant, 172 parts of a distillate were obtained.

The distillate was extracted by using methylene chloride. The small amount of formaldehyde present as dissolved in the extract was removed with ammonia water. The extract was dehydrated with desiccated sodium sulphate. The methylene chloride was distilled and removed. As a result, 75.5 parts of refined trioxane were obtained.

The extraction residue after trioxane was extracted contained 30.0 parts of formaldehyde. Then paraformaldehyde was mixed into it to make it 61%-formalin which was used as a raw material.

Reference Example 1

20 parts of a phosphoric acid type cation exchange resin were added to 110 parts of 61%-formalin. Then the mixture was distilled in the same manner as in Example 1. The distillation at 92° C. was so slow that the distillate at 98 to 99° C. was collected for 3.5 hours. The amount of distillation was 75 parts. The content of trioxane in the distillate was 3.5%.

On the other hand, the same operation as above was carried out by using a phosphoric acid type inorganic cation exchange or a cation exchange resin (Amberlite IRC–50) having —COOH radicals as exchange radical.

In this case, the content of trioxane in the distillate was substantially nil.

EXAMPLE 2

110 parts of 61%-formalin were distilled while keeping the distilling temperature at 92° C. in the presence of 10 parts of an H type cation exchange resin (Amberlite IR–120) by using the same apparatus as in Example 1. With the start of the distillation, 50.8 parts of 61%-formalin were continuously added to keep the amount of the liquid in the kettle constant. The trioxane in the distillate was extracted with methylene chloride every 4 hours.

Paraformaldehyde corresponding to the amount of production of the trioxane was added to the extraction residue. Then it was continuously added by means of the continuously adding device. This operation was repeated seven times. Thus, 82.4 parts of 96.5%-paraformaldehyde were used. By refining the thus obtained distillate in the same manner as in Example 1, 88.3 parts of refined trioxane could be obtained.

EXAMPLE 3

100 parts of an H type cation exchange resin (Amberlite IR–120) were added to 700 parts of 68.5%-formalin. The mixture was distilled while keeping the distilling temperature at 92° C. With the start of the distillation, 900 parts of 68.5%-formalin were continuously added to keep the amount of the liquid in the kettle constant. Thus, in 24 hours, the amount of the distillate reached 902 parts. Its composition was of 48.2% trioxane and 15.4% formaldehyde.

EXAMPLE 4

By using the same apparatus as in Example 1, 110 parts of 61%-formalin and 10 parts of an H type cation exchange resin (Amberlite IR–120) were mixed and the mixture was distilled. The distilling temperature was kept at 92° C. by means of the automatic temperature adjuster. With the start of the distillation, 192 parts of 61%-formalin were continuously added to keep the amount of the liquid in the kettle constant. Thus the distillation was carried out for 28 hours. As a result, 190 parts of distillate were obtained. Then the trioxane in the distillate was extracted by using 600 parts of isopropyl ether. The extract was passed through a filter of 5 parts of anhydrous potassium carbonate and the isopropyl ether was distilled. Water and formaldehyde were distilled out together with the isopropyl ether. Thus 85.5 parts of refined trioxane were obtained.

EXAMPLE 5

When 210 parts of a trioxane-containing distillate obtained in the same manner as in Example 1 were cooled to 0° C. and were centrifugally separated, 88.5 parts of trioxane of about 98% composition (containing water and formaldehyde as impurities) were obtained. 100 parts of tetrahydrofuran were added thereto. By distilling the tetrahydrofuran, 81 parts of refined trioxane were obtained.

EXAMPLE 6

200 parts of isopropyl ether were added to 100 parts of trioxane of a purity of about 98% obtained by such treatment as in Example 5. When the isopropyl ether was distilled, 88.4 parts of refined trioxane were obtained.

EXAMPLE 7

A distilled mixture of trioxane obtained in the same manner as in the above Example 1 was cooled to about 0° C. and was centrifugally separated. 400 parts of methylene chloride were added to 100 parts of the thus obtained crude trioxane (composed of 97.49% by weight trioxane, 0.722% by weight formaldehyde and 1.79% by weight water). The methylene chloride was distilled. Water and formaldehyde were contained in the methylene chloride distillate. After the methylene chloride was distilled away, 90 parts of a colorless transparent liquid having substantially no formaldehyde smell remained in the kettle. When the liquid was cooled, it solidified and showed a melting point of 61 to 62° C. When the liquid was distilled, it was distilled out at a boiling point of 112 to 114° C.

EXAMPLE 8

200 parts of methylene chloride were added to 100 parts of crude trioxane (composed the same as in Example 7). The methylene chloride was distilled away. 200 parts of methylene chloride were further added to the residue in the kettle. When the mixture was treated in the same manner, 93.2 parts of trioxane having no formaldehyde smell at all remained.

*Reference Example 2.—Polymerization test of refined trioxane*

Whether the trioxane refined in the above mentioned process could be subjected to a polymerizing reaction or not was tested by the following process:

0.004 to 0.005 part of an ethyl ether complex compound of boron trifluoride was added to a solution consisting of 10 parts of trioxane and 10 parts cyclohexane. The mixture was reacted at 70° C. for 15 minutes while being agitated under moisture prevention. The agitation was then stopped. The reaction was continued at 45° C. for 60 minutes. Then water was added and the reaction was stopped. The thus produced polymer was separated by filtration. The polymer was washed three times with hot water. Finally it was washed with hot acetone and was then dried under a reduced pressure at the room temperature.

The inherent viscosity of the polymers measured at 60° C. as a 0.5%-solution in p-chlorophenol containing 2% α-pinene.

The results are tabulated below:

Results of polymerization of refined trioxane.

| Trioxane obtained in the respective examples | Rates of yield of the polymer in percent | Inherent viscosity |
| --- | --- | --- |
| Example 1 | Trace | |
| Example 4 | 75.5 | 1.76 |
| Example 5 | 64.6 | 1.96 |
| Example 6 | 70.2 | 2.01 |
| Example 7 | 63.5 | 2.01 |
| Example 8 | 71.0 | 1.95 |

What I claim is:

1. A process for producing trioxane which comprises mixing a 40 to 75% aqueous solution of formaldehyde with more than 0.5% by weight of a cation exchange resin having —$SO_3H$ radicals as the exchange radical, heating and distilling the mixture of said aqueous solution of formaldehyde and said cation exchange resin at a temperature of about the azeotropic temperature of 91.4° C. of trioxane and water to obtain a distillate containing trioxane.

2. A process according to claim 1 wherein a solvent selected from the group consisting of chlorinated hydrocarbon and hydrocarbon ether is added to the distillate containing trioxane, said solvent forming an azeotropic mixture with water, whereby trioxane is extracted, and then distilling the extract.

3. A process according to claim 1 wherein the distillate containing trioxane is cooled to about 0° C. and crude trioxane is separated by centrifuging, adding to said crude trioxane a solvent selected from the group consisting of chlorinated hydrocarbon and hydrocarbon ether, said solvent forming an azeotropic mixture with water, whereby trioxane is extracted, and then distilling the extract.

References Cited in the file of this patent

UNITED STATES PATENTS

| | | |
| --- | --- | --- |
| 2,304,080 | Frank | Dec. 8, 1942 |
| 2,347,447 | Walker | Apr. 25, 1944 |
| 2,465,489 | Sokol | Mar. 29, 1949 |
| 2,479,559 | Dolnick et al. | Aug. 23, 1949 |